Figure 1:
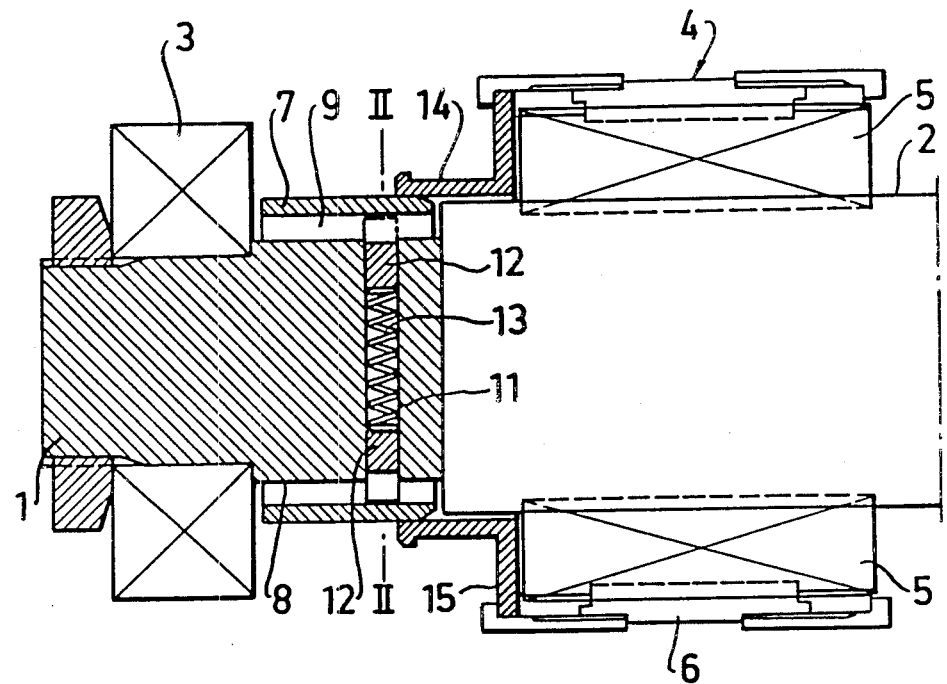

United States Patent [19]

Granbom

[11] Patent Number: 4,742,896

[45] Date of Patent: May 10, 1988

[54] BRAKE MEANS

[76] Inventor: Bo Granbom, 13 Lostigen, S-731 42 Köping, Sweden

[21] Appl. No.: 881,715

[22] Filed: Jul. 3, 1986

[51] Int. Cl.[4] .............................................. F16D 63/00
[52] U.S. Cl. .................................. 188/82.74; 74/89.15; 74/424.8 R; 188/82.77; 188/82.8; 188/82.9; 188/110
[58] Field of Search ....................... 310/77, 80, 92, 93; 188/30, 70 R, 71.1, 82.1, 82.74, 82.77, 82.8, 82.9, 135, 136; 74/89.15, 424.8 R

[56] References Cited

U.S. PATENT DOCUMENTS

| 2,572,465 | 10/1951 | Fuehrer et al. | 74/424.8 R |
| 2,701,478 | 2/1955 | Riess | 74/424.8 R |
| 2,758,485 | 8/1956 | Jahnel | 74/424.8 R |
| 3,213,701 | 10/1965 | Earl, Jr. | 74/424.8 R |
| 3,732,744 | 5/1973 | Rowland | 74/424.8 R |
| 3,762,227 | 10/1973 | Bohnhoff | 74/89.15 |
| 4,137,784 | 2/1979 | Griffin | 74/89.15 |
| 4,479,397 | 10/1984 | Jelinek et al. | 74/89.15 |

Primary Examiner—Andres Kashnikow
Attorney, Agent, or Firm—Cushman, Darby & Cushman

[57] ABSTRACT

Brake means at devices for converting a rotary motion into a linear one by means of a threaded spindle (1) and a member (4) arranged in engagement with the threads thereof, and moving along this at the rotation of the spindle (1). The brake means consists of a ring (7) arranged at one end of the spindle and operable in one direction with the spindle (1) as well as a collar (14) arranged at the member (4) coaxially with the ring (7) and projecting from said member (4), the collar (14) coacting telescopically with the ring (7) and the surfaces of collar (14) and ring (7) engaging each other and producing a braking moment sufficient to stop the spindle (1).

8 Claims, 1 Drawing Sheet

U.S. Patent   May 10, 1988   4,742,896

BRAKE MEANS

This invention relates to a brake means in a device for converting a rotary motion into a linear one.

Such devices consist in principle of a threaded spindle and a nut member arranged at this and provided with threads corresponding to the spindle. At the rotation of the spindle the nut member will be displaced in one or the other direction along the spindle depending on the direction of rotation thereof. The nut member has usually the shape of a bracket provided with a number of rolls with threads engaging the threads of the spindle.

The spindle is normally driven by an electric motor which is stopped by means of a limit switch when the nut member approaches an end position of the spindle. However, at an erroneous function there is always the risk that the electric motor does not stop and that the nut member is driven to the end of the spindle and to stop against the peripheral equipment of the device. In principle the nut member will be wedged and the whole device must be dismounted in order to loosen the nut so that the spindle can be turned again.

This invention relates to a brake means by which the spindle and consequently the motor are braked to a standstill before the nut-shaped member has get stuck in an end position. This is possible through the fact that the invention has been given the characteristic features defined in the claims.

Figure 2:
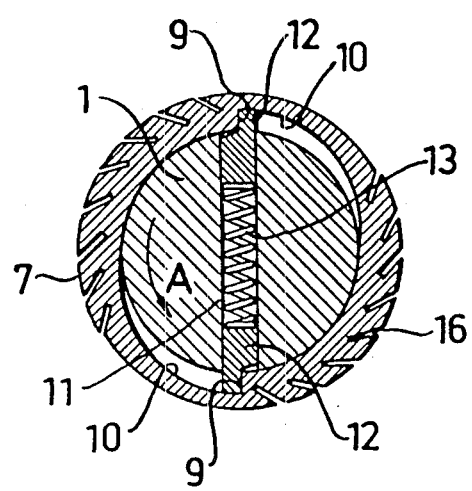
Figure 3:
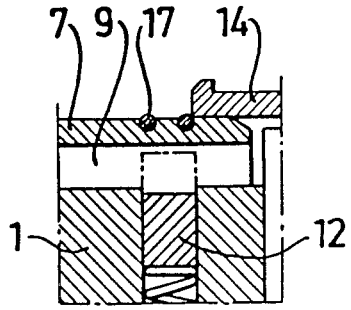

The invention will be described in greater detail in the form of an example with reference to the drawing wherein FIG. 1 shows schematically an end of a device for converting a rotary motion into a linear one and provided with the brake means according to the invention, FIG. 2 is a section taken along the line II—II in FIG. 1, and FIG. 3 is a partial section of a modified embodiment.

The very device for converting a rotary motion into a linear one is of conventional type and in the example shown 1 designates the spindle, the mantle surface 2 of which has threads (usually trapezoidal threads) profiled in a suitable manner. The threads are not drawn on the drawing. In FIG. 1 only one end of the spindle is shown but it is to be understood that both ends thereof are mounted (ball bearings 3) in the standard of the device to be rotatably driven therein. The drive is usually carried out by means of an electric motor not shown here. In the example shown a nut member 4 is provided with rolls 5 having grooves or threads corresponding to the spindle and rolling on the inside of the housing 6 of the nut member 4. The inside of the housing has also threads (not drawn) corresponding to the spindle 1 and rolls 5. At the rotation of the spindle 1 in one direction the nut member 4 will move axially along the spindle in one direction. If the direction of rotation of the spindle is reversed the nut member will move in the other direction along the spindle. This nut member 4 is usually connected with for instance a pipe or the like surrounding the spindle and forming in principle a piston rod. The device described above is publicly known per se and is no part of the invention. Therefore this known device need not be described in greater detail than what is apparent from the above.

If the nut member 4 at continued turning of the spindle 1 will be moved unintentionally to the outermost end position of the spindle the member 4 will be "screwed home" against the end components—ball bearing, bearing housing—included in the device because of the threads and the inertia of the system. The nut member 4 is then locked in the end position with such a force that the device must be dismounted to release the parts. The risk of damage is obvious.

In order to eliminate the risk of the nut member 4 getting stuck in the two end positions the spindle is according to the invention provided with a brake means at each end. For the sake of simplification this is only described for one end of the spindle 1.

The brake means consists of a ring 7 rotatably mounted on a turned-down part 8 of the spindle end. The ring 7 has on its inside a shoulder 9, the bottom surface 10 of which passes continuously into the cylindrical inside of the ring 7 receiving the spindle part 8. The shaft has a diametrical bore 11 in which radially movable carrier means 12 are arranged. In the relative position between the spindle 1 and the ring 7 shown in FIG. 2 the carrier means 12 engage with the shoulders 9 and are pressed radially outwards by means of a spring 13. At the rotation of the spindle 1 in the direction of the arrow A (see FIG. 2) the ring 7 will thus rotate together with the spindle.

The nut member 4 is provided with an annular flange or collar 14 fixed to the member which, thus, moves together with the nut member 4 when this moves along the spindle. In the example shown the collar 14 is mounted at the nut member 4 by means of a flange 15 or the like. The inside diameter of the cylindrical collar 14 is somewhat smaller than the outside diameter of the ring 7. In FIG. 2 the ring 7 is shown with inclined incisions 16 running axially in the periphery of the ring.

In case the spindle 1 is rotated so that the nut member 4 is moved to the left as seen in FIG. 1 and the electric motor is not stopped in time the collar 14 of the nut member 4 will be moved in over the mantle surface of the rotating ring 7. In the example shown this is possible thanks to the fact that the material on the outside of the ring 7 can spring inwardly due to the incisions 16. According as the collar 14 is moved in over the ring 7 the friction between the ring and the collar will increase. Finally this friction will be so great that the electric motor is not capable of rotating the spindle 1. The device will stop.

When the spindle 1 is thereafter turned by means of the electric motor in the opposite direction of the arrow A no torsional movement is exerted on the ring 7 enclosed by the collar 14 because the carrier means 12 do not meet any obstacle at the rotation of the spindle 1 in this direction. Simultaneously with the rotation of the spindle 1 in the opposite direction of the arrow A the nut member 4 will be moved to the right as seen in FIG. 1. Without any mutual rotation between ring 7 and collar 14, nut member 4 will be drawn axially by the ring 7.

When the collar 14 is moved in over the ring 7 a braking torsional moment on the spindle 1 is formed which will increase according as the collar 14 is moved in over the ring 7. This torsional moment can for instance amount to about 2000N which moment is enough to stop the electric motor. At the release the collar 14 will be drawn axially by the ring 7 and only a frictional force of about 100N is to be overcome. A load on the nut member of merely 100N only involves a very small increase of the torsional moment of the otherwise freely rotatable spindle 1 in the opposite direction of the arrow A. Thus, the electric motor has no difficulties in moving the nut member 4 in opposite direction and consequently releasing the collar 14 from the ring 7.

It is to be understood that the spindle 1 is provided with a corresponding ring at the opposite end, which ring is placed in a mirror-image relation in order to operate in the same way as the ring 7 and that the nut member 4 is provided with a collar corresponding to the collar 14 at its other end side. This collar is not drawn in FIG. 1.

Moreover, it is to be understood that the ring 7 can be provided with some type of resilient surface coating or the collar 14 be made resilient instead of the incisions 16. The object is to achieve enough friction by the brake means formed according to the invention in order to stop the electric motor in case the nut member has been moved too far towards one end of the spindle, at the same time as the electric motor should be able to move the nut member back to its range of operation without difficulty. In certain cases this aim can also be achieved by means of a conicity of the outside of the ring and the inside of the collar, respectively.

An alternative embodiment is shown in FIG. 3. According to the example shown the ring 7 is formed with two grooves running around the periphery which each include an O-ring 17 or the like extending outside the mantle surface of the ring 7. These replace but serve the same purpose as the incisions 16 previously treated. Of course the corresponding elastic means increasing friction can alternatively be arranged on the inside of the collar 14.

For one skilled in the art it is quite within the scope of the invention to dimension the ring and collar so that the ring, instead of what has been described above, will enclose the outside of the collar with part of its inside.

What I claim is:

1. Brake means in a device for converting rotary motion into linear motion by means of a threaded spindle and a member arranged in engagement with the threads thereof, and moving therealong in response to rotation of said spindle, characterized in that the brake means comprises a ring arranged at one end of said spindle for rotation therewith in a first direction and independent rotation therefrom in a second direction, and a non-rotating collar arranged on the member coaxially with said ring and projecting from said member, the collar coacting telescopically with said ring and radially facing surfaces of the collar and the ring directly engaging each other producing a rotational braking moment sufficient to stop the spindle from rotating in said first direction.

2. Brake means as claimed in claim 1, characterized in that the inside of the collar engages the outside of the ring.

3. The device of claim 2, characterized in that the inside diameter of the collar is somewhat smaller than the outside diameter of the ring, said collar and/or ring being elastically resilient.

4. Brake means as claimed in claim 1, characterized in that the ring has at least one recessed shoulder arranged on the inside with which a carrier means arranged in the spindle engages in order to drive the ring in one direction of the spindle.

5. Brake means as claimed in claim 1, characterized in that the ring is provided with substantially axially extending grooves on its outside.

6. Brake means as claimed in claim 1, characterized in that the ring is provided with one or more peripheral grooves on its outside which each receive an elastic ring extending outside the mantle surface of the ring.

7. Brake means as claimed in claim 1, characterized in that the spindle has two diametrically arranged carrier means which at the drive of the ring by means of the spindle are maintained radially resilient in engagement with two diametrical shoulders arranged in the ring.

8. Brake means as claimed in claim 1, characterized in that a ring in mirror-image relation to the other ring is also arranged at the other end of the spindle and that said member has another collar coacting with the ring placed in mirror-image relation.

* * * * *